United States Patent [19]

Athey et al.

[11] 4,321,849

[45] Mar. 30, 1982

[54] TENSION ADJUSTMENT FOR A BAND SAW

[75] Inventors: Stuart E. Athey; Thomas M. Johnson; Raymond P. Shaeffer, all of Troy, Ohio

[73] Assignee: Hobart Corporation, Troy, Ohio

[21] Appl. No.: 150,837

[22] Filed: May 19, 1980

[51] Int. Cl.³ .............................................. B23D 55/10
[52] U.S. Cl. ........................................ 83/816; 83/788
[58] Field of Search ................. 83/816, 817, 818, 819, 83/814, 788

[56] References Cited

U.S. PATENT DOCUMENTS

| | | | |
|---|---|---|---|
| 33,732 | 11/1861 | Baar | 83/816 |
| 2,549,384 | 4/1951 | Radecki et al. | |
| 2,585,957 | 2/1952 | Meeker et al. | |
| 2,617,451 | 11/1952 | Fink et al. | |
| 3,402,627 | 9/1968 | Robinson et al. | 83/816 |
| 3,680,421 | 8/1972 | Conner et al. | 83/816 |
| 3,902,391 | 9/1975 | Bond | 83/788 |

*Primary Examiner*—Donald R. Schran
*Attorney, Agent, or Firm*—Biebel, French & Nauman

[57] ABSTRACT

A tension adjustment for a band saw having a band saw blade (30) encircling upper and lower band wheels (26, 28) disposed on opposite sides of the cutting table (12), with the lower band wheel (28) and the drive motor (66) being supported by a housing (50) which is pivotally mounted to the frame structure (10) of the band saw and which can be moved toward and away from the upper band wheel (26) by means of a threaded rod (84) extending between the frame (10) and the housing (50) so that the tension in the band saw blade can be adjusted by pivotal movement of the housing (50) supporting the lower band wheel (28).

9 Claims, 5 Drawing Figures

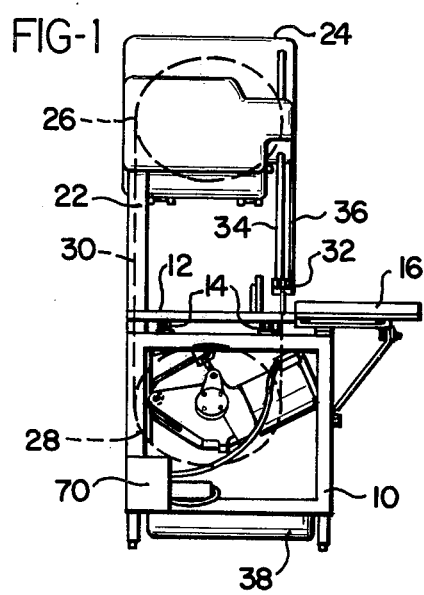
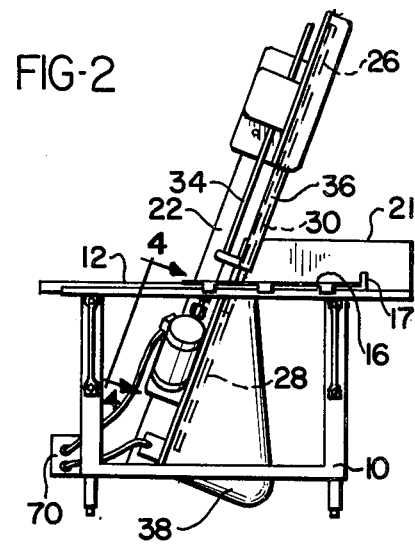
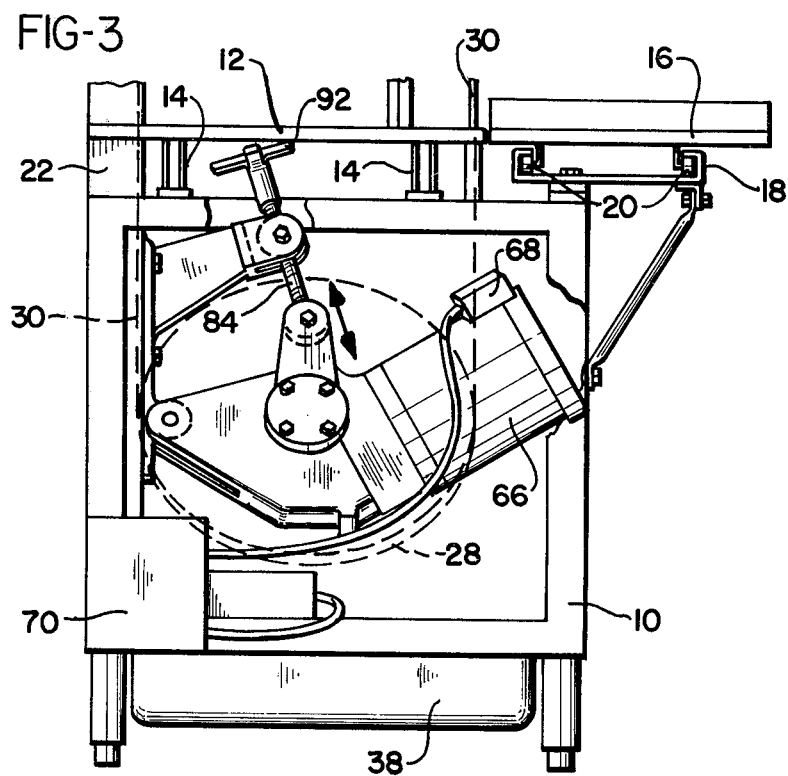

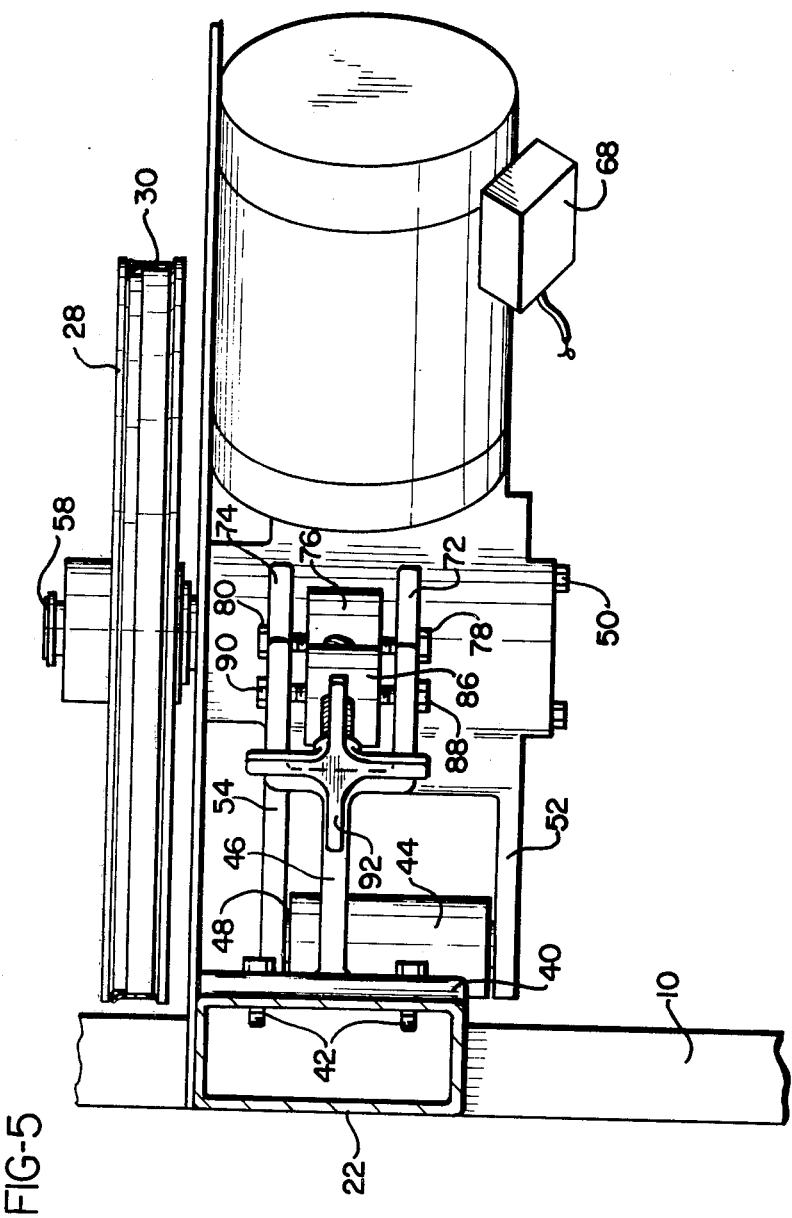

TENSION ADJUSTMENT FOR A BAND SAW

BACKGROUND OF THE INVENTION

1. Field of the Invention

The present invention relates to band saws, and more particularly to means for adjusting the tension in an endless band saw blade.

2. Prior Art

It is well known that some means must be provided in a band saw to relax the tension on its blade in order to permit blade changing, to accommodate blades of slightly varying length, and to tension the blade to produce enough tractive force transmission capability through frictional contact with the lower band drive wheel to deliver the necessary cutting force from wheel to blade. Most prior art band saws provide for such an adjustment by producing rectilinear motion of either the upper band wheel, as is disclosed for example in U.S. Pat. No. 2,585,957 which is assigned to the assignee of the present invention, or by adjustment of the lower band wheel such as, for example, as illustrated in U.S. Pat. No. 2,617,451.

Such devices employ a slide way in which the mount for the movable band wheel is supported for the rectilinear motion toward and away from the other band wheel in order to maintain the cutting flight of the blade at a predetermined angle with respect to the meat cutting table. These slide ways, however, are prone to contamination from cuttings from the band saw which causes difficulty in moving the slide supporting the band wheel, along the slide way, and in addition, are generally difficult to clean because of the contour involved.

SUMMARY OF THE INVENTION

The present invention overcomes the above described difficulties and disadvantages associated with prior art band saws, and particularly those designed for meat cutting in which removal of contamination is a particularly important consideration, by providing a pivotal support for a protective housing which also carries the lower band wheel, the associated motor and gear transmission components, such protective housing being easily cleaned and preventing contamination of the components therein.

The present invention is utilized in a band saw of the type which generally includes a frame supporting a cutting table, upper and lower band wheels mounted in a common plane but on opposite sides of the cutting table for rotation about respective substantially parallel central axes, and supporting an endless band saw blade which encircles the wheels in driven engagement therewith. One flight of the band saw blade is exposed at the cutting table for cutting objects, such as meat or the like, placed on the table. Drive means rotates the lower band wheel to cause movement of the band saw blade for cutting purposes.

The present invention utilizes a support means which is mounted to the frame for pivotal movement about an axis parallel to the axis of rotation of the lower band wheel and which has the drive means and the lower band wheel mounted thereto for pivotal movement therewith. It also includes an adjustment means which is mounted to the frame and connected to the support means for the lower band wheel and the drive means, for causing the pivotal movement thereof in order to apply a desired tensioning load on the band saw blade.

In the preferred embodiment, the drive means comprises a motor which is mounted to a gear box which in turn is mounted to or integrally formed with the support means which is a housing pivotally mounted to the frame. Both the motor and the gear box are provided with housings which completely encase the drive means except for air vents for motor cooling, in order to prevent scrap material from entering places difficult to clean. The housing, including the drive, and the support means, present a smooth exterior surface which can be easily cleaned after use of the saw.

Also in its preferred form, the motor is disposed on an opposite side of the axis of rotation of the band wheel from the pivotal position of the support means on the frame. Positioning of the motor in this manner provides a leverage which assists in application of tension to the band saw blade due to the weight of the motor, and thus reduces the force otherwise necessary to increase the tension through use of the adjustment means.

The adjustment means is designed to permit relative motion between it and the support means as well as the frame in order to permit the pivotal movement between the support means and the frame. In its preferred form, the adjustment means includes a threaded rod which is pivotally mounted in both the support means and the frame above the axis of rotation of the lower band wheel, which permits ease of rotation of the adjustment means by the band saw operator.

BRIEF DESCRIPTION OF THE DRAWINGS

FIG. 1 is a side elevational view of a band saw including the improvement of the present invention;

FIG. 2 is a front elevational view of the band saw of FIG. 1;

FIG. 3 is an enlarged view of the lower portion of the band saw of FIG. 1;

FIG. 5 is an enlarged top view of the tensioning and adjustment mechanism, taken generally on line 5—5 in FIG. 4, and with the scrap cover removed.

DETAILED DESCRIPTION OF THE PREFERRED EMBODIMENT

Figure 4:
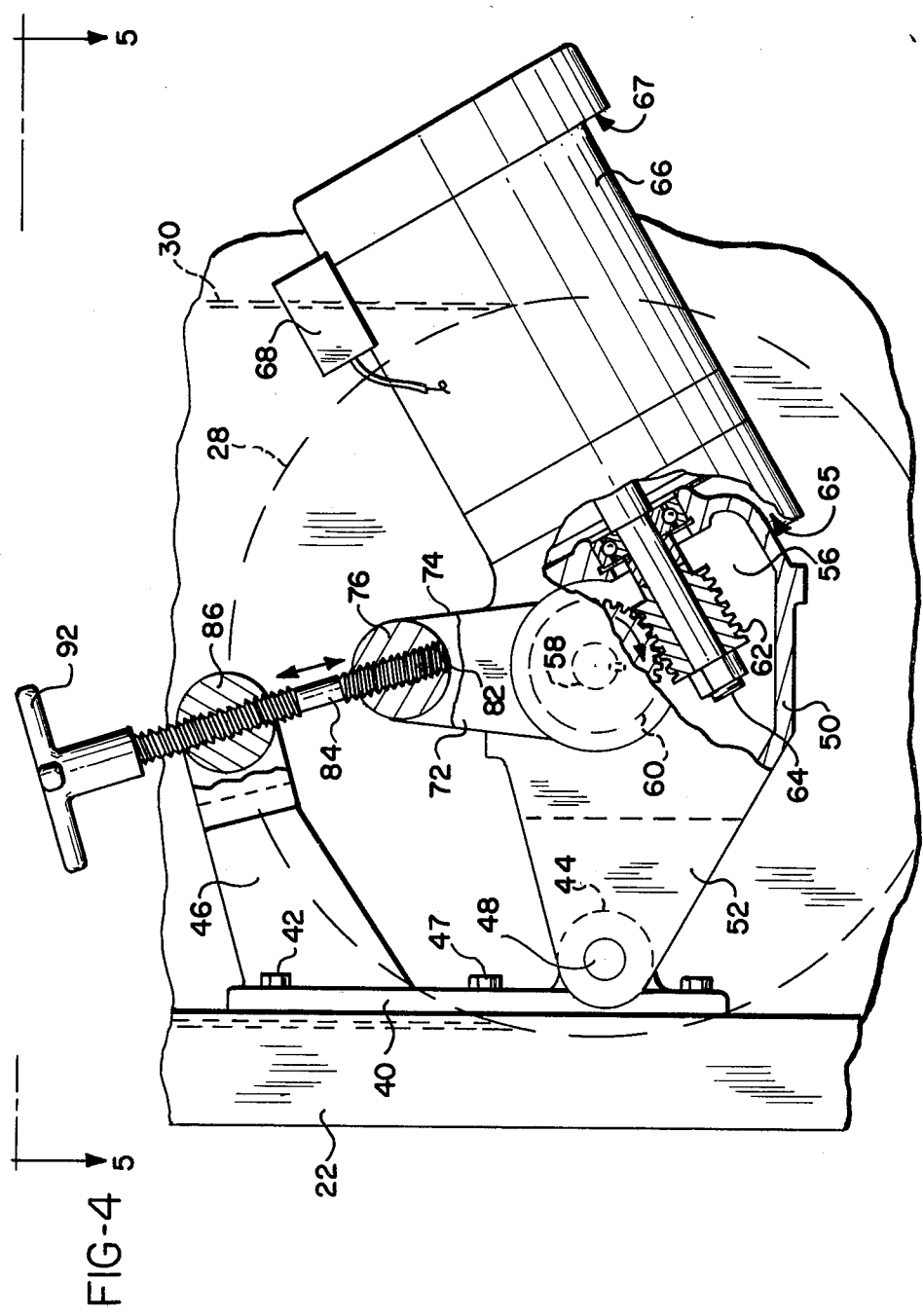
FIG. 4 is a more greatly enlarged view of the tensioning and adjustment mechanism shown in FIG. 3, with parts broken away to show details of the drive.

The drive and tensioning means of the present invention is intended for utilization in a band saw and particularly in a meat cutting band saw of the type illustrated in FIGS. 1 and 2. Such a band saw generally comprises a base frame 10 which supports a stationary table 12 on brackets 14, and a carriage 16 with a backing plate 17 is mounted on a runway 18 which captures a plurality of rollers 20 to which the carriage 16 is secured. The tops of the table and carriage are in the same plane, and a gage plate 21 is movably supported extending upward from table 12 to permit adjustment of the thickness of material to be cut. This construction permits the carriage 16 to be reciprocated laterally adjacent the stationary table 12 in order to feed the material through the saw and cut it to the desired width.

At the rear center portion of the base frame 10 is erected a support column 22 which forms part of the frame structure of the band saw and to which is secured an upper housing 24. Within housing 24 an upper band wheel 26 is journalled for rotation about its central axis in housing 24.

Support column 22 preferably is secured to base frame 10 so as to be at an acute angle to the infeed direction of the material to be cut, as illustrated in FIG. 2, although the positioning of the support column may be vertical as is more conventional. Support column 22 extends into the lower portion of base frame 10 and supports the lower band wheel 28 through the tensioning and adjustment mechanism of the present invention, as described in more detail below. Encircling the upper and lower band wheels 26 and 28 is a band saw blade 30 which has one straight cutting flight extending through the stationary table 12 for cutting the material, and a return flight which extends along support column 22.

An upper blade guide 32 is adjustably secured to a rod 34 supported by upper housing 24, to permit the blade guide 32 to be positioned toward and away from the cutting table to locate the blade guide 32 immediately above the upper surface of the material, while different thicknesses of material are cut. An upper blade guard 36, which has its lower end portion secured to blade guide 32, extends over the portion of the saw blade 30 between upper housing 24 and blade guide 32 to shield the blade along that portion of the flight above the blade guide. A lower blade guide (not shown) is also provided, being mounted to the base frame 10 of the band saw at a position aligned with the cutting flight of the band saw blade 30 and located below the table 12 and above the lower band wheel 28.

A scrap catcher 38 is provided beneath table 12 and is suitably hinged at its lower end to move outward and downward from the closed position, as seen in FIG. 2. The catcher 38 encloses the lower band wheel 28, but can be opened for access to the lower band wheel 28, for cleaning, and for removing scraps from the catcher 38.

Referring to the support and adjustable tensioning means of the present invention, as best illustrated in FIGS. 3, 4 and 5, a bracket 40 is secured by bolts 42 to the lower portion of support column 22, and has a cylindrical extension 44 formed in the lower portion thereof and a Y-shaped arm or yoke 46 formed at the upper portion thereof. Extension 44 has a cylindrical opening defined therein, which has its central axis parallel to the axis of rotation of lower band wheel 28. A pivot locating pin 48 is fixed in the opening, with the ends of the pin protruding. A support housing 50 is held by the ends of locating pin 48 which extend through arm extensions 52 and 54 formed on support housing 50, so that housing 50 is pivotally mounted to bracket 40.

A gear box 56 is incorporated within support housing 50, in the region where the drive shaft 58 supporting lower band wheel 28 is journalled. Drive shaft 58 extends through housing 50, and is journalled on each side of the housing. A worm wheel 60 is keyed to the shaft, and is engaged by a worm gear 62, which is in turn keyed to an output shaft 64 of drive motor 66. The drive motor is mounted to a flange formed on the support housing 50 at one side of gear box 56. The motor is preferably mounted with output shaft 64 in a plane perpendicular to drive shaft 58 and on the opposite side thereof from pivot locating pin 48 in order to add the maximum amount of leverage from the weight of the motor to application of tension to the saw blade 30.

As can be seen in FIGS. 4 and 5, support housing 50, gear box 56 and motor 66 all have exterior surfaces which merge to prevent scrap material from entering any of these components and thus prevent contamination thereof in areas which would otherwise be difficult to clean. The entire drive assembly is totally enclosed except for air passages 65 and 67 for cooling the motor, and its outer surfaces are easily cleaned. Electrical inputs to the motor are contained within the box 68 and, as shown in FIGS. 1 and 2, extend from an electrical connector box 70 which is in turn connected to a power supply source.

Referring again to FIGS. 4 and 5, a further pair of extensions 72 and 74 are formed in the upper portion of housing 50. Between them is a cylindrical member 76 supported by screws 78 and 80 which are free to rotate in extensions 72 and 74, and are threaded into member 76 along its central axis, to permit pivotal movement of the member 76 about its central axis.

Member 76 is provided with a diametrically extending threaded opening 82 perpendicular to its rotational axis. A threaded rod 84 is engaged within opening 82, and has its opposite end, which is oppositely threaded as shown in FIG. 4, received in a cylindrical member 86 which is identical to cylindrical member 76, except for the direction of threading. Cylindrical member 86 is in turn supported in the opening of Y-shaped arm 46, as shown in FIG. 5, by bolts 88 and 90 which are free to rotate within the arm 46 and are threaded into member 86 along its axis of rotation to permit pivotal movement thereof.

Secured to the upper end portion of rod 84 is handle 92 which permits the operator of the saw to adjust tension in the blade 30 upon rotation of the handle 92.

It is to be noted that in locating pin 48 relative to the axis of rotation of lower band wheel 28, it is desirable that the cutting flight of the blade 30 will be in a plane substantially perpendicular to the plane in which both the locating pin 48 and the drive shaft 58 lie when the nominal length of blade is utilized. Only slight pivotal movement of the support housing 50, and thus the lower band wheel 28, will be produced by adjustment in the tensioning device, and this slight pivotal movement of the center of wheel 28 in either direction will not cause any appreciable misalignment of the cutting flight of the band saw blade 30 with respect to the upper or lower blade guides.

In operation, in order to adjust the tension on the saw blade 30 of the present invention, the operator need merely rotate the handle 92. This will cause the threaded engagement between the rod 84 and cylindrical members 76 and 86 to produce an expansion or contraction of the distance between these two members, and resulting pivotal rotation of the housing 50 about the axis of pin 48 will raise or lower the lower band wheel to increase or decrease the tension on the blade 30, as desired. This adjustment has no effect on the direct drive coupling of the motor to wheel 28.

Since the motor 66 is secured to the support housing 50 on the opposite side of the axis of rotation of band wheel 28 from the pin 48, and the motor shaft is perpendicular to shaft 58, the weight of the motor will assist to the maximum extent in increasing the tension on the band saw blade due to the leverage resulting from its location at a maximum distance from the pin 48. Thus, less torque need be applied by the operator to handle 92 in order to increase the tension on the blade 30.

While the form of apparatus herein described constitutes a preferred embodiment of this invention, it is to be understood that the invention is not limited thereto, and that changes may be made therein without departing from the scope of the invention.

What is claimed is:

1. In a band saw including a frame, a cutting table supported by said frame, at least two band wheels mounted for rotation about their respective substantially parallel central axes and disposed in a generally common plane in spaced relation on opposite sides of said cutting table, an endless band saw blade encircling said wheels and driven thereby with a blade flight exposed at said cutting table for cutting an object placed thereon, and drive means coupled to rotate one of said band wheels, wherein the improvement comprises:

support means mounted to said frame for pivotal movement about an axis parallel to said axis of rotation of said one band wheel, said drive means and said one band wheel being mounted thereto for movement therewith and said support means including a gear box having an output shaft coupled to said one band wheel for both support and rotation thereof;

adjustment means mounted to said frame and connected to said support means, for causing said pivotal movement thereof to adjust the tension in said band saw blade; and said drive means including a motor having a shaft drivingly coupled to said output shaft supporting said one band wheel, and said motor is disposed on an opposite side of said output shaft from the location of said pivotal axis of said support means.

2. The improvement in a band saw as defined in claim 1, including a pin supported in said frame and providing the pivotal mounting for said support means.

3. The improvement in a band saw as defined in claims 1 or 2, wherein said adjustment means includes an at least partially threaded rod;

means pivotally connecting an end portion of said rod to said support means;

means pivotally connecting another portion of said rod to said frame;

said rod being rotatably supported in both said connecting means, at least one of said connecting means having a threaded connection to said rod such that rotation of said rod will cause pivotal movement of said support means to adjust tension in said blade.

4. The improvement in a band saw as defined in claim 3 wherein said rod has oppositely threaded portions, and said connecting means are each correspondingly threaded and engaged with said threaded portions of said rod.

5. The improvement of claim 4 wherein said support means and drive means present smooth and essentially continuous exterior surfaces for ease in cleaning therefrom contamination due to waste material from operation of the saw.

6. A band saw including vertically spaced upper and lower band wheels mounted in a frame and an endless cutting band saw blade fitted around said wheels;

a drive shaft coupled to said lower band wheel and having a common axis of rotation therewith;

a gear box having an output coupled to and supporting said drive shaft and an input including a motor mounting flange;

a drive motor supported on said flange and coupled to said input;

a pivot support on said frame for said gear box and having a pivotal axis extending in spaced parallel relation to said axis of rotation of said drive shaft; and an adjustment linkage connected at one end to said frame and at its other end to said gear box and arranged to control the motion of said gear box, motor, and lower wheel about said pivot support.

7. A band saw as defined in claim 6, wherein said motor is mounted on the opposite side of said gear box from said pivot support to maximize the effect of motor weight in causing tension in the blade.

8. A band saw including vertically spaced upper and lower band wheels mounted in a frame and a band saw blade fitted around said wheels;

a drive shaft supporting said lower band wheel;

a housing pivotally mounted to said frame and supporting said drive shaft and including a motor mounting flange thereon on an opposite side of said drive shaft from the pivotal mounting of said housing;

a drive motor supported on said flange and having a motor shaft located adjacent said flange;

means connecting said motor shaft to said drive shaft; and an adjustable support interconnecting said frame and said housing for providing pivotal movement of said lower band wheel toward and away from said upper band wheel.

9. A band saw as defined in claim 8, wherein said connecting means is a gear drive from said motor shaft to said drive shaft.

* * * * *